United States Patent [19]

Pagani

[11] Patent Number: 4,836,235
[45] Date of Patent: Jun. 6, 1989

[54] VALVE

[75] Inventor: Ezio Pagani, Bergamo, Italy

[73] Assignee: Bridge Products, Inc., Northbrook, Ill.

[21] Appl. No.: 21,141

[22] Filed: Mar. 3, 1987

[30] Foreign Application Priority Data

Mar. 4, 1986 [IT] Italy .............................. 21126/86[U]

[51] Int. Cl.⁴ .............................................. F16K 15/20
[52] U.S. Cl. ..................................... 137/223; 152/427
[58] Field of Search ........................... 137/223, 234.5; 152/427, DIG. 11

[56] References Cited

U.S. PATENT DOCUMENTS

| | | | |
|---|---|---|---|
| 1,313,554 | 8/1919 | Nielsen | 137/233 |
| 2,240,129 | 4/1941 | Broecker | 137/223 |
| 2,473,591 | 6/1949 | Killner | 251/144 |
| 2,862,515 | 12/1958 | Briechle | 137/234.5 |
| 3,396,743 | 8/1968 | Mackal | 137/223 |
| 3,429,330 | 2/1969 | Bogossian et al. | 137/223 |
| 3,489,166 | 1/1970 | Williams | 137/234.5 |
| 4,077,456 | 3/1978 | Smith | 152/427 |
| 4,176,681 | 12/1979 | Mackal | 137/516.29 |
| 4,275,756 | 6/1981 | Carius | 137/234.5 |
| 4,340,080 | 7/1982 | Lefrancois | 137/234.5 X |
| 4,506,695 | 3/1985 | Kuypers | 137/223 |
| 4,739,813 | 4/1988 | Pagani | 137/223 |

FOREIGN PATENT DOCUMENTS

| | | |
|---|---|---|
| 672880 | 3/1966 | Belgium . |
| 802791 | 2/1951 | Fed. Rep. of Germany ...... 137/223 |
| 2340493 | 9/1977 | France . |
| 2417044 | 9/1979 | France . |
| 2383374 | 12/1981 | France . |
| 1044423 | 9/1966 | United Kingdom . |

Primary Examiner—John Rivell
Attorney, Agent, or Firm—Willian Brinks Olds Hofer Gilson & Lione Ltd.

[57] ABSTRACT

The disclosed tire valve includes an elastic valve body having a through passageway formed therein, with a constriction formed at an intermediate portion of the through passageway. A valve pin is provided with a gasket and is mounted to slide within the through passageway. A spring is positioned between the pin and the valve body to bias the pin to a sealing position. Preferably, the pin is formed of an elastic material. The valve body defines a sharp edged step adjacent to the constriction and the valve pin defines a sharp edged flange positioned to abut the step in the valve body so as to increase the bursting pressure of the valve.

18 Claims, 2 Drawing Sheets

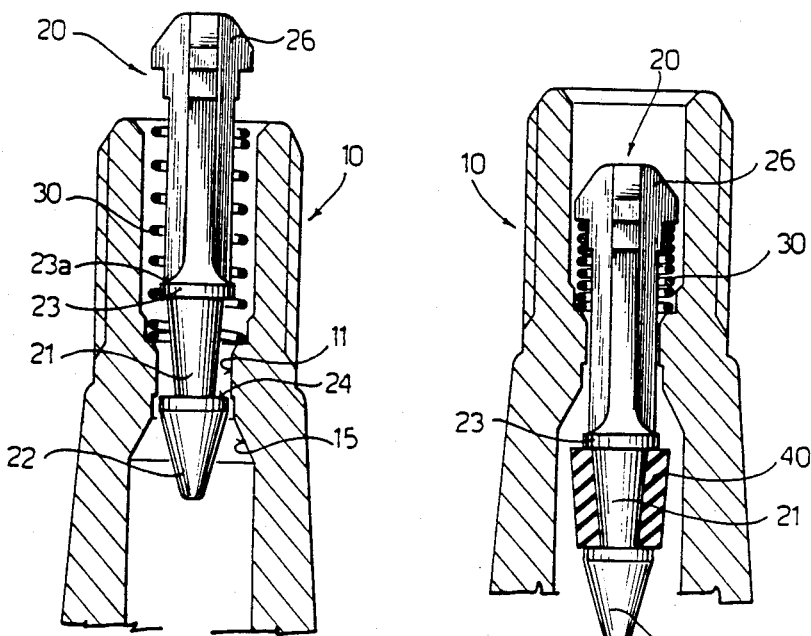
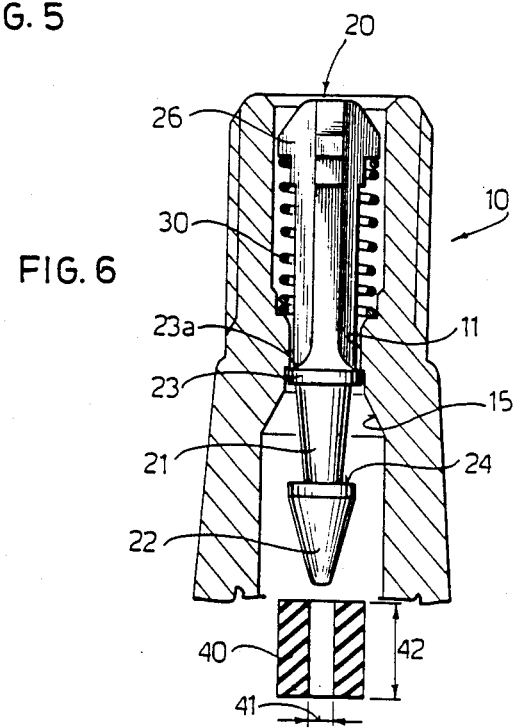
FIG. 5
FIG. 7
FIG. 6

VALVE

BACKGROUND OF THE INVENTION

This invention relates to valves, and is particularly well-suited for use in tubeless tire valves of the type which either snap in place or are clamped in place on a wheel rim.

There is at present interest among tire manufactures to increase the working pressures of tubeless tires used for automobiles. Because of this interest, it is increasingly important that tire valves for tubeless tires be able to operate reliably at high working pressures.

European patent application No. 83 108 204 discloses one prior art tire valve. This tire valve includes a valve body which defines a through passageway and a constriction at an intermediate portion of the passageway. A valve pin is slideably positioned in the passageway and carries a sealing member positioned to bear against a sealing surface defined by the constriction to seal the passageway. The valve pin further defines a flange adjacent the sealing member, and this flange has an external diameter slightly larger than the minimum diameter of the passageway at the constriction such that the flange is sized to pass through the constriction without destruction of the pin or the valve body. This valve provides a high bursting pressure, significantly higher than the bursting pressure of conventional tire valves. Nevertheless, at extremely high working pressures the valve pin can be observed to move with respect to the valve body. Such valve pin movement may be a disadvantage in some applications, because it may create the appearance of unreliability. Of course, at a higher working pressure the valve will burst and allow the valve pin to be expelled out of the valve body.

One object of this invention is to provide a valve which can be adapted for use with tubeless tires, which seals in a perfectly reliable manner at unusually high working pressures, which is unusually inexpensive to manufacture, and which provides both reduced valve pin movement at high working pressures and an increased bursting pressure as compared with the valve described in the above-identified European patent application.

SUMMARY OF THE INVENTION

According to this invention, a valve of the type described above is provided with means for defining a step in the valve body around the passageway at the constriction adjacent to the sealing surface and means for defining a shelf on the flange shaped and positioned to engage the step to prevent the pin from being expelled out of the passageway. As explained in detail below, the step in the valve body and the shelf on the flange of the valve pin cooperate to increase the bursting pressure of the valve significantly and to minimize movement of the valve pin at high working pressures.

In the preferred embodiment described below, the valve body is formed of a resilient plastic material, as is the valve pin. In addition, the end of the valve pin adjacent to the sealing member is preferably pointed to facilitate assembly of the valve. This embodiment also provides a conical shape to the portion of the valve pin which receives the sealing member in order to enhance air flow through the open valve. These characteristics improve the valve performance and reduce the cost of the valve at the same time.

Furthermore, these characteristics enable the valve to be assembled in a simple, automatic manner. The preferred assembly of the valve of this invention includes the following steps:

A. The valve body is arranged vertically with the portion of the valve body that will receive the valve spring pointed upwardly;

B. A valve spring is inserted in the passageway of the valve body;

C. The valve spring falls due to its weight until it contacts the constriction in the passageway of the valve body;

D. The valve pin is inserted into the passageway of the valve body; during this operation the pointed end of the valve pin centers the pin in the passageway and in the spring;

E. Insertion of the valve pin is continued by elastically deforming the elastic valve body and forcing the flange of the valve pin through the constriction in the passageway of the valve body;

F. The pin is then released and remains in position inside the valve body with the shelf on the flange of the valve pin abutting against the step in the valve body around the passageway;

G. The tubular gasket is then inserted onto the valve pin from below, its insertion on the valve pin being facilitated by the pointed end of the pin.

The invention itself, together with further objects and attendant advantages, will best be understood by reference to the following detailed description, taken in conjunction with the accompanying drawings.

BRIEF DESCRIPTION OF THE DRAWINGS

FIGS. 3–7 show successive stages in the assembly of the valve of FIG. 1.

DETAILED DESCRIPTION OF THE PRESENTLY PREFERRED EMBODIMENTS

Figure 1:
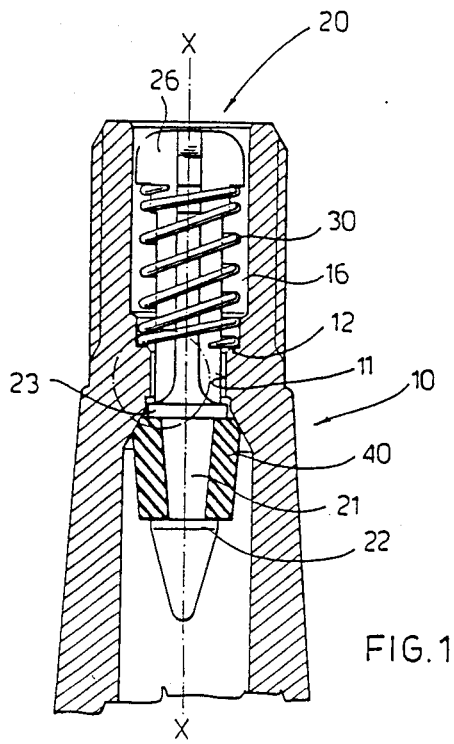
FIG. 1 is a cross-sectional view of a valve which incorporates a presently preferred embodiment of this invention.
Figure 2:
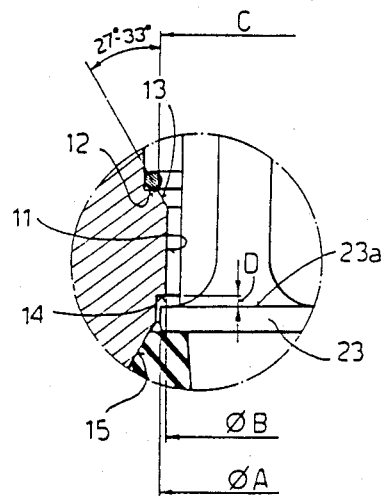
FIG. 2 is an enlarged view of the structure indicated by the outlining circle of FIG. 1.

Turning now to the drawings, FIGS. 1 and 2 show two views of a valve which incorporates a presently preferred embodiment of this invention. This valve is for example a snap-in type valve for tubeless tires, of the general type described in the above-identified European patent application. This valve includes four separate parts: an outside valve body 10, an internal valve pin 20, an internal valve spring 30, and a sealing member or gasket 40 which is mounted to the valve pin 20.

As shown in FIG. 1, the valve body 10 defines a through passageway 16 which is centered about an axis X—X. This through passageway 16 extends from the outer end of the valve body 10, which is customarily provided with threads as shown in FIG. 1, to the inner end of the valve body 10, which is to the bottom in FIG. 1. This through passageway 16 defines a constriction 11 at which the diameter of the through passageway 16 is at a minimum. This constriction 11 can be thought of as dividing the valve body 10 into two parts: an outside part (shown to the top of FIG. 1)and an inside part (shown to the bottom of FIG. 1) The outside part provides a ledge 12 that serves as a seat for the spring 30. An internal, flared, conical surface 13 is provided in the valve body 10 between the ledge 12 and the constriction 11.

The bottom part of the constriction 11 defines a step 14 which in this embodiment is an annular surface oriented substantially transverse to the axis X—X. A conical sealing surface 15 is provided adjacent to the step 14 towards the inside part of the valve body 10. This sealing surface 15 cooperates with the top part of the gasket 40 to seal the through passageway 16.

The valve pin 20 is shaped to slide within the through passageway 16. This valve pin 20 includes an enlarged head 26 which bears against the upper portion of the spring 30. The pin 20 also includes a flange 23 which in turn defines a shelf 23a which faces the step 14 and is positioned to abut against it. In this embodiment the shelf 23a is an annular surface oriented perpendicular to the axis X—X. The end of the pin 20 directed to the inside of the valve body 10 is provided with a gasket support surface 21 that is shaped as a truncated cone, with the larger diameter end of the truncated cone positioned adjacent to the flange 23. The inner end 22 of the valve pin 20 is pointed, and this inner end 22 defines a further abutment 24 positioned to bear against the gasket 40. Thus, the gasket 40 is captured between the flange 23 and the abutment 24.

In order better to define the presently preferred embodiment the following details of construction are provided. In this embodiment both the valve body 10 and the valve pin 20 are formed of a resilient plastic material. Preferably the body 10 is formed of an acetyl copolymer plastic such as that marketed by HOECHST under the trade name HOSTAFORM SVP-964. The preferred material is shock resistant, waterproof and resistant to UV light, photo-degradation and oxidation. Black pigments are often important in providing these characteristics. The same material can be used for the pin 20. In this embodiment the external diameter A of the flange 23 is preferably about 5%-9% greater than the minimum diameter B of the constriction 11. The conical surface 13 preferably has a maximum external diameter C which is larger than the diameter A of the flange 23 by an amount equal to about 5% to 7% of the diameter A. The conical surface 13 is positioned with respect the axis X—X of the through passageway 16 at an angle which is preferably in the range of 27° an 33°. In the preferred embodiment, the angle between the conical surface 13 and the axis X—X is 30°. The assembled valve without pressure across the constriction 11 is preferably configured such that the distance D between the step 14 and the shelf 23a is greater than 0.2 mm and less than 1 mm. Preferably, the gasket 40 is shaped as a cylindrical gasket obtained by cutting a cylindrical tube into pieces of the appropriate length. In the embodiment described below the gasket 40 preferably has an internal diameter 41 corresponding to about 25% of its length 42 in its rest condition (FIG. 6).

Figure 3:
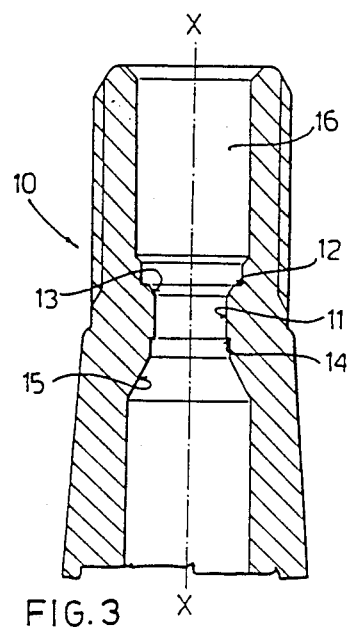
Figure 4:
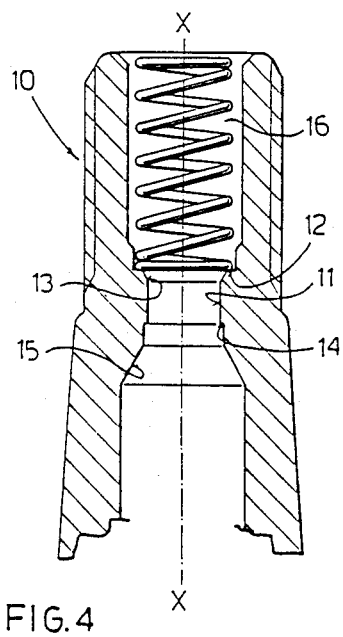

In order to assemble the valve shown in FIGS. 1 and 2, the valve body 10 is preferably positioned with the threaded end upwardly as shown in FIG. 3. The valve spring 30 is then inserted into the top part of the valve body 10 such that the spring 30 falls under the influence of gravity into contact with the ledge 12 (FIG. 4). The pin 20 is then inserted into the through passageway 16. The pointed end 22 centers the pin 20 in the valve 10 and the spring 30 and facilitates assembly (FIG. 5). The pin 20 is then moved, preferably with a sharp knock, such that the flange 23 elastically deforms the body 10 and the flange 23 is pushed beyond the constriction 11. The pin 20 is then released, and the force of the spring 30 causes the shelf 23a to abut the step 14 to hold the pin 20 in place (FIG. 6). The gasket 40 is then mounted onto the gasket support surface 21 over the inner end 22 (FIG. 7). The pointed end 22 facilitates positioning of the gasket 40 onto the gasket support surface 21.

It has been determined in laboratory tests that the shelf 23a and the step 14 cooperate to increase the bursting pressure of the valve illustrated in FIGS. 1 and 2 by about 60% as compared with a similar valve which does not include the step 14 and the flange 23a. This increase in the bursting pressure of the valve can significantly increase the field of use of the valve. Furthermore, the shelf 23a and step 14 cooperate to prevent the valve pin 20 from moving outwardly at high pressures below the bursting pressure of the valve, Such movement of the valve pin 20 can be mistaken for evidence of imminent valve failure. The shelf 23a and the step 14 completely overcome this problem. Furthermore, the tapered shape of the gasket support surface 21 minimizes the resistance to air flow through the passage way 16 when the valve is open.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. A valve comprising:
a valve body which defines an outside part, an inside part, a through passageway, and a constriction at an intermediate portion of the passageway;
a valve pin slideably disposed in the passageway and carrying a sealing member positioned to bear against a sealing surface defined by the constriction to seal the passageway, wherein at least one of the valve body and the valve pin is formed of a resilient material;
a flange defined on the valve pin adjacent the sealing member, said flange having an external diameter slightly larger than the minimum diameter of the passageway at the constriction,
said valve body, valve pin and flange sized and configured to allow the flange to pass from the outside part through the constriction to the inside part without destruction of the pin or the valve body through elastic deformation of at least one of the valve body and the valve pin;
means for defining an annular step surface in the valve body around the passageway adjacent to the constriction on the same side of the constriction as the sealing surface; and
means for defining an annular shelf surface on the flange shaped and positioned to provide abutting surface to surface contact with the annular step surface to prevent the pin from being expelled out of the passageway;
said sealing member positioned and configured to remain in contact with the sealing surface when the shelf engages the step.

2. The improvement of claim 1 wherein the passageway defines an axis, wherein the step defines a first annular pin restraining surface oriented transverse to the axis, and wherein the shelf defines a second annular pin restraining surface oriented transverse to the axis and positioned to bear against the first pin restraining surface to prevent the pin from being expelled out of the passageway.

3. The improvement of claim 1 wherein the valve body defines a flared conical surface around the passageway on the side of the constriction opposite the step.

4. The improvement of claim 3 wherein the passageway defines an axis and wherein the flared conical surface is inclined at an angle in the range of 27°–33° with respect to the axis.

5. The improvement of claim 4 wherein the angle is 30°.

6. The improvement of claim 3 wherein the flared conical surface defines an external diameter which is at least 5% greater than the external diameter of the flange.

7. The improvement of claim 1 wherein the separation between the shelf and the step is within the range of 0.2 mm–1 mm when the pressure differential across the constriction is zero.

8. The improvement of claim 1 wherein at least one of the pin and the valve body is formed of a plastic material.

9. The improvement of claim 8 wherein the valve body is formed of a resilient plastic material.

10. The improvement of claim 9 wherein the plastic material comprises an acetyl copolymer.

11. The improvement of claim 1 wherein the external diameter of the flange is about 5%–9% greater than the minimum diameter of the passageway at the constriction.

12. The improvement of claim 1 wherein the pin defines a pointed end adjacent the sealing member.

13. The improvement of claim 1 wherein the sealing member comprises a cylindrical gasket.

14. The improvement of claim 13 wherein the gasket defines a length and an internal diameter, and wherein the internal diameter is about 25% of the length.

15. The improvement of claim 13 wherein the pin defines a support surface for the gasket, and wherein the support surface is shaped as a truncated cone.

16. The improvement of claim 1 wherein the sealing member is positioned on the valve pin to contact the sealing surface as the pin moves to seal the passageway before the flange engages the step, thereby maintaining a gap between the flange and the step in the absence of a pressure differential across the sealing surface.

17. The improvement of claim 1 further comprising a spring positioned around the valve pin to bear on the valve body to bias the flange towards the step and the sealing member against the sealing surface.

18. The improvement of claim 1 wherein the valve is a tubeless tire valve.

* * * * *